United States Patent [19]

Gallagher et al.

[11] Patent Number: 4,835,249

[45] Date of Patent: May 30, 1989

[54] PROCESS FOR PREPARING POLYIMIDES

[75] Inventors: Patrick E. Gallagher, Pittsfield, Mass.; Ronald A. Greenberg, Evansville, Ind.

[73] Assignee: General Electric Company, Pittsfield, Mass.

[21] Appl. No.: 948,081

[22] Filed: Dec. 31, 1986

[51] Int. Cl.$^4$ .............................................. C08G 69/26
[52] U.S. Cl. .................................. 528/353; 528/126; 528/128; 528/173; 528/179; 528/352; 528/376; 528/377
[58] Field of Search ............... 528/353, 376, 377, 352, 528/128, 126, 173, 179

[56] References Cited

U.S. PATENT DOCUMENTS

| | | | |
|---|---|---|---|
| 3,803,085 | 4/1974 | Takekoshi et al. | 260/46.5 F |
| 3,833,544 | 9/1974 | Takekoshi et al. | 260/47 CB |
| 3,905,942 | 9/1975 | Takekoshi et al. | 260/47 CP |
| 3,991,004 | 11/1976 | Takekoshi et al. | 260/37 N |
| 3,998,840 | 12/1976 | Williams et al. | 260/326 N |
| 4,011,198 | 3/1977 | Takekoshi et al. | 260/47 CP |
| 4,073,773 | 2/1978 | Banucci et al. | 260/47 CP |
| 4,098,800 | 7/1978 | Banucci et al. | 260/346.3 |
| 4,197,396 | 4/1980 | Banucci et al. | 528/208 |
| 4,221,897 | 9/1980 | Takekoshi | 528/125 |
| 4,324,882 | 4/1982 | Takekoshi | 528/206 |
| 4,417,044 | 11/1983 | Parekh | 528/179 |
| 4,443,592 | 4/1984 | Schmidt et al. | 528/188 |

*Primary Examiner*—John Kight
*Assistant Examiner*—M. L. Moore
*Attorney, Agent, or Firm*—Bernard, Rothwell & Brown

[57] ABSTRACT

A process for making certain polyimides involves dissolving substantially equimolar amounts of an aromatic dianhydride and an organic diamine in a high-boiling, aprotic solvent, heating the reaction solution to form an insoluble polyimide prepolymer and to distill out water of reaction, separating the solid polyimide prepolymer and melt polymerizing the polyimide prepolymer to form the desired polyimide.

10 Claims, No Drawings

PROCESS FOR PREPARING POLYIMIDES

BACKGROUND OF THE INVENTION

The present invention relates to a process for preparing thermoplastic polyimides. More particularly, the invention relates to a process for preparing certain crystalline or semi-crystalline, chemically resistant polyimides which are not easily produced by conventional procedures.

The thermoplastic polyimides with which the present invention is concerned are high performance thermoplastics. Because of the thermoplastic nature of these polymers, they can be formed into useful articles by such techniques as injection molding, extrusion, blow-molding and thermoforming. These polymers are characterized by high heat distortion temperatures and excellent physical properties.

In general, polyimidse are prepared by reacting an aromatic dianhydride with an organic diamine. In the search for polymers having superior performance properties, certain polyimides have been discovered which have crystalline or semi-crystalline characteristics and good resistance to chemicals, such as cleaning solvents, fuels and oils, and the like. These crystalline or semi-crystalline polyimides often have exceptionally high glass transition temperatures, which make them useful for high temperature applications. In general, these polyimides have linear, rigid aromatic moieties in the aromatic dianhydride residues or the organic diamine residues of the polymer backbone. Polyimides having these structures have posed difficulties in their manufacture, primarily because of their relative insolubility in organic solvents.

Thermoplastic polyimides, such as polyetherimides, have been prepared by a variety of processes. The two basic processes used for making these polymers are the so-called "melt polymerization" process and the "solution polymerization" process. The melt polymerization process has been described in several U.S. patents, representative of which is U.S. Pat. No. 3,803,085 to T. Takekoshi and J. Kochanowski. This process involves combining an aromatic dianhydride and an organic diamine and heating the mixture under an inert atmosphere to form a homogeneous melt. Water formed during the polymerization reaction is removed at a temperature of up to 350° C., and the final stage of the reaction is advantageously conducted under reduced pressure to facilitate removal of water. The basic melt polymerization technique has been improved by employing certain catalysts to enhance yields or reaction rates. (E.g., see Takekohi et al, U.S. Pat. No. 3,833,544, F. Williams III et al., U.S. Pat. No. 3,998,840 and Takekoshi, U.S. Pat. No. 4,324,882.) In addition, the melt polymerization method has been adapted to the continuous mode by conducting the reaction in an extrusion apparatus. (E.g., see Takekoshi et al., U.S. Pat. No. 4,011,198 and Banucci, et al., U.S. Pat. No. 4,073,773.)

Solution polymerization is generally conducted by reacting an aromatic dianhydride and an organic diamine in an inert solvent at temperatures up to about 200° C. With this procedure, water formed during the reaction is typically removed by azeotropic distillation. The resulting polymer is generally recovered by mixing the reactant solution with a precipitant, such as methanol. The reaction solvents employed for solution polymerization reactions are selected for their solvent properties and their compatability with the reactants and products. High-boiling, nonpolar organic solvents have been preferred. (E.g., see Takekoshi, et al., U.S. Pat. No. 3,991,004.) Dipolar, aprotic solvents and phenolic solvents have also been used. (E.g., see Takekoshi, et al., U.S. Pat. No. 3,905,942.)

The melt polymerization and solution polymerization techniques suffer from certain disadvantages. The melt polymerization technique involves combining monomers which have widely differing volatilities at the high temperatures employed. Because of the disparate volatilities of these components, controlling the stoichiometry of the mixture has been proven difficult. A further disadvantage of the melt polymerization procedure is that the reaction mixture passes through a so-called "cement stage" as polyamide acid intermediate is formed. During this phase of the reaction, the reaction mixture becomes very viscous and difficult to process. The solution process, on the other hand, permits accurate control of stoichiometry, but reaction times are relatively long and it is sometimes difficult to achieve complete conversion of the reactants or intermediate polyamide acids to the polyetherimide product.

Because of these disadvantages, several processes have been developed which combine the two techniques. For example, Takekoshi, U.S. Pat. No. 4,221,897 describes reacting an aromatic dianhydride and an organic diamine in an aqueous reaction medium substantially devoid of organic solvent. This reaction produces a polyamide acid intermediate which is recovered as a finely divided powder which can be used to make high molecular weight polyimide by melt extrusion. In a similar process, Banucci et al. describe in U.S. Pats. Nos. 4,098,800 and 4,197,396, a process which involves reacting an aromatic dianhydride and an organic diamine in an inert organic liquid selected from methylene chloride, chloroform, 1,2-dichloroethane and mixtures thereof with acetone. The reaction produces an oligomeric polyamide acid which is substantially insoluble in the organic liquid and thus separates from the reaction mixture as a precipitate. The polyamide acid may be recovered in powdered form which is useful in powder-coating procedures wherein the desired polyetherimide is obtained in situ by heating to a temperature above the glass transition temperature. In U.S. Pat. No. 4,417,044, S. L. Parekh discloses a process for making polyimides which involves reacting an aromatic dianhydride with an organic diamine in an inert solvent to form a prepolymer-solvent mixture, removing the solvent from the mixture by thin-film evaporation and heating the resulting prepolymer (e.g., in an extruder) to a temperature above its glass transition temperature to form the desired polyimide product.

Although some of the foregoing procedures have been found very useful for preparing conventional polyetherimides, they have not been entirely satisfactory for the preparation of the crystalline, solvent resistant polyimides containing linear, rigid structural units. For example, it has been found that polyetherimides prepared from an aromatic bis(etheranhydride) and a major proportion of p-phenylene diamine have crystalline characteristics and higher temperature and chemical resistance than corresponding polyetherimides prepared from m-phenylene diamine. When such a polyetherimide is produced by first isolating the polyamide acid intermediate, it has been found that a substantial amount of the diamine is bound to the polyamide acid through relatively labile ionic bonds. When these materials are extruded at elevated temperatures, the ionic bond is broken and a significant amount of the diamine is lost through volatilization. This volatilization not only makes controlling the stoichiometry difficult, but also poses a significant health hazard, since the diamine is lost to the atmosphere and condenses on equipment and surfaces surrounding the extruder.

A need exists for a straightforward, efficient process for preparing high performance polyimides. Such process should permit accurate control of the stoichiometry, utilize reasonable reaction times and conventional equipment.

SUMMARY OF THE INVENTION

In accordance with the present invention, a process for making a polyimide of the formula

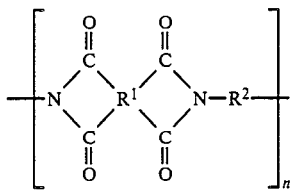

wherein $R^1$, $R^2$ and n are as hereinafter defined, involves dissolving substantially equimolar amounts of an aromatic dianhydride of the formula

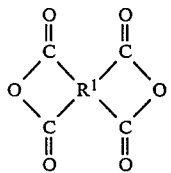

an an organic diamine of the formula

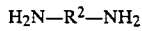

$$H_2N-R^2-NH_2$$

in a high-boiling, aprotic organic solvent to form a reaction solution;

heating the reaction solution under imidization conditions for a time sufficient to effect substantially complete reaction of the aromatic dianhydride and the organic diamine to form an insoluble polyimide prepolymer and to effect substantially complete distillation of the water of reaction out of the reaction solution;

separating the insoluble polyimide prepolymer from the reaction solution by a solid-liquid separation technique; and melt polymerizing the polyimide prepolymer at an elevated temperature under imidization conditions to form the desired polyimide.

The process of this invention produces high performance polyimides of good quality using a single, straightforward procedure and conventional equipment.

DETAILED DESCRIPTION OF THE INVENTION

The polyimides hat may be prepared by the method of this invention are those having crystalline or semicrystalline characteristics resulting from linear, rigid aromatic groups in their chemical structures. The linear, rigid aromatic groups may occur in the dianhydride residues of the polymer, the diamine residues or both. The polyimides may be represented by the general formula

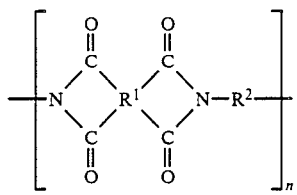

wherein n is an integer greater than 1, e.g., from 10 to about 10,000 or more; $R^1$ is a member selected from the group consisting of

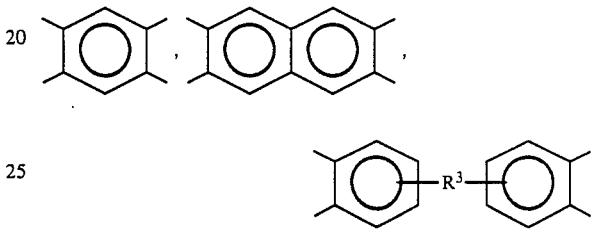

where $R^3$ is —O—, —S—, —SO$_2$—, —CO— or —O—Z—O—, and Z is a member of the class consisting of (A)

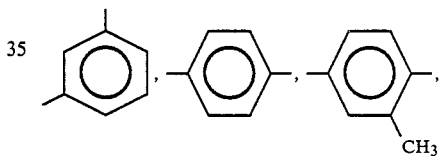

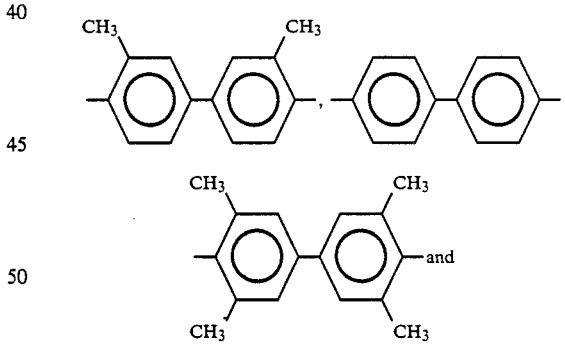

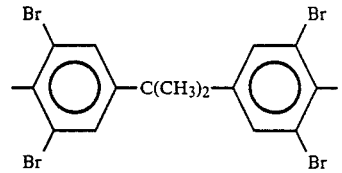

and (B) divalent organic radicals of the formula

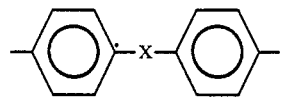

where X is a member selected from the group consisting of —$C_yH_{2y}$—, —CO—, —$SO_2$—, —O— and —S—, wherein y is an integer from 1 to about 5; and $R^2$ is a divalent organic radical selected from the group consisting of (a) aromatic hydrocarbon radicals having from six to about twenty carbon atoms and halogenated derivatives thereof, (b) alkaline radicals having from 2 to about 20 carbon atoms, cycloalkylene radicals having from 3 to about 20 carbon atoms, (c) from about $C_2$ to about $C_8$ alkylene-terminated polydiorganosiloxane, and (d) divalent radicals of the general formula

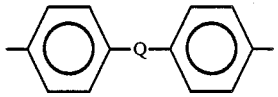

where Q is a member selected from the group consisting of —S—, —O—, —CO—, —$SO_2$— and $C_xH_{2x}$— and x is an integer of from 1 to about 5, provided that when $R^1$ is

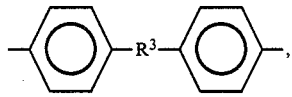

$R^3$ is —O—Z—O—, and Z is

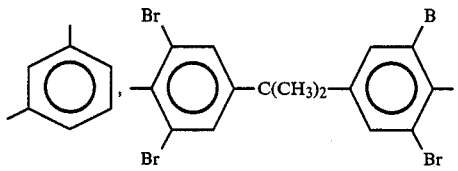

or

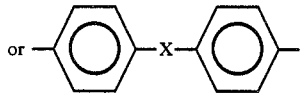

where X is —$C_yH_{2y}$— or —$SO_2$—, then $R^2$ is

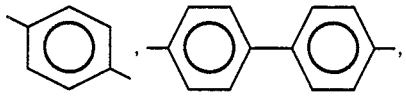

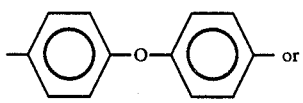

or

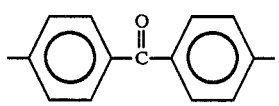

The first step in the process of this invention involves combining an aromatic dianhydride of the formula

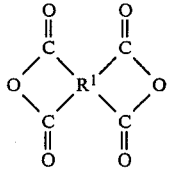

and an organic diamine of the formula

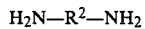

$H_2N$—$R^2$—$NH_2$ in a high-boiling, aprotic organic solvent to form a reaction solution. The aromatic dianhydride and the organic diamine are combined in substantially equimolar amounts. For example, the molar ratio of aromatic dianhydride to organic diamine ranges from about 0.8:1 to about 1.2:1, preferably from about 0.9:1 to about 1.1:1. The high-boiling, aprotic organic solvent advantageously has a boiling point above about 110° C., preferably above about 150° C. The relatively high boiling point of the solvent permits reaction temperatures sufficiently high to effect rapid and efficient conversion of the reactants to the desired polyimide product without employing pressurized reaction vessels.

The high-boiling, aprotic organic solvent is also one in which the polyamide acid and polyimide prepolymer are substantially insoluble. Although complete dissolution of the reactants in the solvent is not necessary, advantageously, the organic diamine and the aromatic dianhydride exhibit some degree of solubility in the reaction solvent. Examples of such high-boiling, nonpolar solvents are toluene, xylene, ethylbenzene, propylbenzene, chlorobenzene, dichlorobenzene, trichlorobenzene, biphenyl, terphenyl, diphenylether, siphenyl sulfide, acetophenone, chlorinated biphenyl and chlorinated diphenylethers. Preferred solvents are the chlorobenzenes, particularly o-dichlorobenzene.

The initial concentration of the aromatic dianhydride in the high-boiling aprotic solvent may vary over a wide range. In general, the concentration is sufficient to maintain an efficient reaction rate and result in substantially complete precipitation of the reaction product. Typical concentrations of total solids in the reaction solvent range from about 10% to about 60% by weight, preferably from about 20% to about 35% by weight.

If desired, a chain-terminating agent may be employed to control the molecular weight of the final polymer product. Monofunctional amines such as aniline and toluidine, or monofunctional dianhydrides, such as phthalic anhydride may be employed. In general, the molar ratio of the chain-terminating agent to the aromatic dianhydride ranges from about 0.02:1 to about 0.2:1, preferably from about 0.06:1 to about 0.12:1.

The reaction between the aromatic dianhydride and the organic diamine is initiated by heating the solution of the reactants in the high-boiling, aprotic organic solvent to a temperature sufficiently high to effect the reaction. To avoid deleterious oxidation reactions, it is preferred that the reaction solution be blanketed under an inert gas during the heating step. Examples of such gases are dry nitrogen, helium, argon and the like. Dry nitrogen is generally preferred. The reaction temperature generally ranges from about 110° C. to about 200° C., preferably from about 135° C. to about 180° C. A convenient means of conducting the reaction is to heat the reaction solution to the refluxing temperature of the reaction solvent.

Water formed as a result of the reaction between the aromatic dianhydride and the organic diamine is advantageously continuously removed from the reaction solvent by azeotropic distillation. The amount of water formed can be used to monitor the degree of completion of the reaction.

As the reaction between the aromatic dianhydride and the organic diamine progresses, it is believed that the first reaction product is a polyamide acid intermediate. It is also believed that this polyamide acid forms ionic bonds with unreacted organic diamine to form a compound having repeating units of the structure

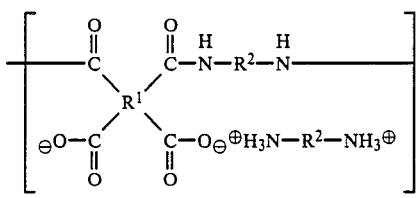

This polyamide acid salt is substantially insoluble in the high-boiling, aprotic solvent and typically separates from the reaction solution as solid or a semi-solid. If the polyamide acid salt is recovered and the imidization reaction is completed by a melt process, a significant amount of the ionically bonded organic diamine may be lost through volatilization.

In accordance with the present invention, it has been discovered that by continuing to heat the polyamide acid salt slurry under imidization conditions, the polyamide acid salt can be substantially quantitatively converted to a polyimide prepolymer. The imidization conditions generally include continuing the heating of the slurry while removing water of reaction. the heating is continued until the reaction is substantially complete, e.g., greater than about 90%, preferably greater than about 95%, most preferably greater than about 99% completion, as determined by the amount of water evolved. Substantially complete reaction can typically be achieved by heating the reaction solution of aromatic dianhydride and organic diamine for a period of about 0.5 to about 10 hours, preferably from about 1 to about 6 hours. The reaction time may vary depending upon the particular reactants employed, the reaction solvent and concentrations.

The reaction of the aromatic dianhydride and the organic diamine may be accelerated by using a polymerization catalyst. Such catalysts are well-known and are described in general terms in the aforementioned U.S. Pats. Nos. 3,833,544, 3,998,840 and 4,324,882. A preferred catalyst is sodium phenyl phosphinate. When employed, the catalyst is generally used in an amount of from about 0.01 to about 0.05 grams of catalyst per one hundred grams of aromatic dianhydride.

The polyimide prepolymer is separated from the reaction solution by a solid-liquid separation technique, such as filtration or centrifugation. Preferably, the polyimide prepolymer is separated by filtration and is dried, e.g., under vacuum, to remove substantially all of the volatile materials. The dried polyimide prepolymer is then subjected to a melt polymerization to obtain a final polyimide product. The melt polymerization serves to remove any remaining traces of volatile material in the prepolymer and effects chain extension and completion of the polymerization to produce a high quality polyimide having a relatively high intrinsic viscosity.

The melt polymerization is effected by heating the polyimide prepolymer to a temperature above the glass transistion temperatures of the prepolymer and the polyimide product. In general, the temperature of the melt polymerization step will range from about 200° C. to about 450° C., preferably from about 250° C. to about 375° C. The melt polymerization may be conducted under reduced pressure to facilitate removal of volatile components. The melt polymerization step may be conducted in a variety of mixing equipment, and a particularly preferred procedure is to conduct the melt polymerization step in an extruder. The melt polymerization step is continued until a polyimide having the desired degree of polymerization is obtained. The optimum time for conducting this step will vary depending upon the particular polyimide being produced and the equipment being used.

The final polyimide product is advantageously extruded into strands and chopped into pellets which may be used for extrusion, injection molding and other applications.

The present process overcomes the problems associated with conventional solution polymerization and melt polymerization techniques, and provides unexpected advantages in the preparation of crystalline and semi-crystalline polyimides. Heretofore, attempts to synthesize such polyimides by a combination solution polymerization/melt polymerization process has led to difficulties. In accordance with the present invention, it has unexpectedly been found that, notwithstanding the precipitation of the polyamide acid salt intermediate, the polymerization can be driven substantially to completion by continuing to heat the reaction slurry under imidization conditions.

Examples of the aromatic dianhydrides that may be used in the process of this invention include pyromellitic anhydride, 2,3,6,7-naphthalenetetracaboxylic acid dianhydride, bis(3,4-dicarboxyphenyl)ether dianhydride, 1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)biphenyl dianhydride;
4,4'-bis(2,3-dicarboxyphenoxy)biphenyl dianhydride; and
4,4'-bis(phthalic anhydride)ether.

A preferred class of aromatic bis(ether anhydride)s includes compounds of formula I, II and III, which follows:

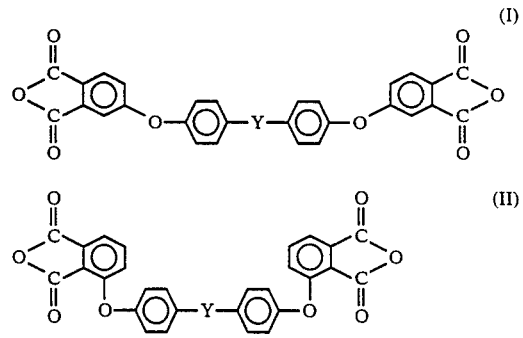

-continued

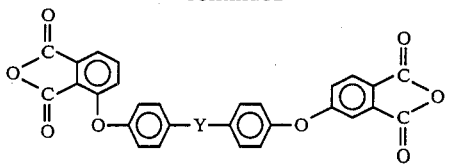
(III)

and mixtures thereof, where Y is selected from the group consisting of —O—, —S—,

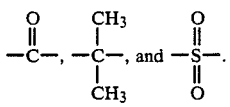

Aromatic bis(ether anhydride)s of formula I include, for example:
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride; and mixtures thereof.

Aromatic bis(ether anhydride)s of formula II include, for example:
2,2-bis([4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-diacarboxyphenoxy)benzophenone dianhydride;
4,4'-bis(2,3-dicarboxyphenoxy)diphenyl sulfone dianhydride; and mixtures thereof.

The aromatic bis(ether anhydride)s of formula III include, for example,
4-(2,3-dicarboxyphenoxy)-4'-(3,4-dicarboxyphenoxy) diphenyl-2,2-propane dianhydride.
4-(2,3-dicarboxyphenoxy)-4'-(3,4-dicarboxyphenoxy) diphenyl ether dianhydride;
4-(2,3-dicarboxyphenoxy)-4'-(3,4-dicarboxyphenoxy) diphenyl sulfide dianhydride;
4-(2,3-dicarboxyphenoxy)-4'-(3,4-dicarboxyphenoxy) benzophenone dianhydride;
4-(2,3-dicarboxyphenoxy)-4'-(3,4-dicarboxyphenoxy) diphenyl sulfone dianhydride, and mixtures thereof.

Advantageously, aromatic dianhydrides, such as pyromelletic dianhydride, and a bis(etheranhydride) are used in combination to obtain a polyimide product having the desired combination of physical and chemical properties.

Examples of organic diamines that may be used in the process of this invention include
The organic diamines of formula (II) include, for example:
m-phenylenediamine,
p-phenylenediamine,
4,4'-diaminodiphenylpropane,
4,4'-diaminodiphenylmethane (commonly named 4,4'-methylenedianiline),
4,4'-diaminodiphenyl sulfide,
4,4'-diaminodiphenyl sulfone,
4,4'-diaminoidiphenyl ether (commonly named 4,4'-oxydianiline),
1,5-diaminonaphthalene,
3,3-diamethylbenzidine,
3,3-dimethoxybenzidine,
2,4-bis(beta-amino-t-butyl)toluene,
bis(p-beta-amino-t-butylphenyl)ether,
bis(p-beta-methyl-o-aminophenyl)benzene,
1,3-diamino-4-isopropylbenzene,
1,2-bis(3-aminopropoxy)ethane, benzidine.

This invention is further illustrated by the folowing examples, which are not intended to be limiting.

EXAMPLE I 2,2-Bis[4-(3,4-dicarboxyphenoxy)phenyl]propane dianhydride (480.0 g, 0.92 mole), p-phenylene diamine (97.98 g, 0.91 mole), phthalic anhydride (3.01 g, 0.020 mole) and sodium phenyl phosphinate (0.086 g) were dissolved in o-dichlorobenzene (2324 g). The solution was heated to 180° C. for one hour. The resulting slurry was cooled to 80° C. and the prepolymer was isolated by filtration. The filtrate, which contains a small amount of dissolved prepolymer was retained for recycle in the next reaction. The wet filter cake was combined with batches from five other reactions. The wet filter cake was vacuum dried to approximately 1% volatiles to produce about 5.5 kg. of dried prepolymer. The prepolymer was extruded in a 1¼ inch, single screw, top vented Killion extruder. The resulting eight pounds of material had a heat distortion temperature of 204° C., a flexural modulus of 440,800 psi and excellent chemical resistance.

EXAMPLE II 2,2-Bis[4-(3,4-dicarboxyphenoxy)phenyl]propane dianhydride (100.0 g, 0.19 mole), p-phenylene diamine (21.2 g, 0.2 mole), phthalic anhydride (1.6 g, 0.01 mole) and sodium phenyl phosphinate (0.018 g) were dissolved in o-dichlorobenzene (493 grams). The reaction temperature was raised to 180° C. and held at that temperature while the water of reaction was removed. The resulting slurry was cooled to 80° C., and the prepolymer was isolated by filtration. The wet cake was dried in a vacuum oven to less than 1% volatiles and the dried prepolymer was polymerized in a Haake rheometer.

EXAMPLE III

The procedure of Example II was repeated in all essential details, but the reaction employed 210 g of fresh o-dichlorobenzene, and 276 g of recycle o-dichlorobenzene containing approximately 2.0% dissolved oligomers from the previous reaction.

EXAMPLE IV 2,2-Bis[4-(3,4-dicarboxyphenoxy)phenyl]propane dianhydride (12.12 kg) p-phenylene diamine (2.56 kg), phthalic anhydride (0.22 kg) and sodium phenyl phosphinate (2.23 g) were dissolved in o-dichlorobenzene (59.55). The reaction temperature was raised to 180° C. and held at that temperature while the water of reaction was removed. The resulting slurry was cooled to 50° C. and the prepolymer was isolated by centrifugation. The wet cake was dried in a vacuum dryer to less than 15% volatiles and the dried prepolymer was polymerized in a 1¼ vacuum vented, single screw WP extruder. The resulting material had an intrinsic viscosity of 0.71 (phenol/TCE) and a glass transition temperature of 226° C.

EXAMPLE V

The procedure of Example IV was repeated in all essential details, but the reaction employed 27.27 kg of fresh o-dichlorobenzene, and 32.27 kg of recycle o-dicylorobenzene containing approximately 1.0% dissolved ligomers from the previous reaction.

We claim:

1. A process for making a polyimide of the formula

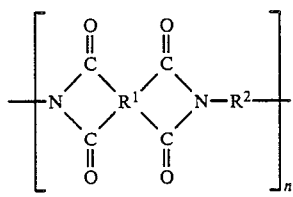

which comprises dissolving substantially equimolar amounts of an aromatic dianhydride of the formula

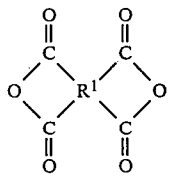

and an organic diamine of the formula $$H_2N-R^2-NH_2$$

in a high-boiling, aprotic organic solvent to form a reaction solution;

heating the reaction solution under imidization conditions for a time sufficient to effect substantially complete reaction of the aromatic dianhydride and the organic diamine to form an insoluble, polyimide prepolymer and to effect substantially complete distillation of the water of reaction out of the reaction solution;

separation of the insoluble polyimide prepolymer from the reaction solution by a solid-liquid separation technique; and melt polymerizing the polyimide prepolymer at an elevated temperature under imidization conditions to form the desired polyimide;

where $R^1$ is a member selected from the group consisting of

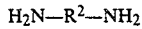

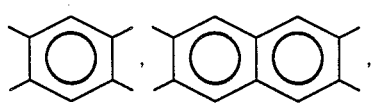

where $R^3$ is —O—, —S—, —SO$_2$—, —CO—, or —O—Z—O— and Z is a member of the class consisting of (A)

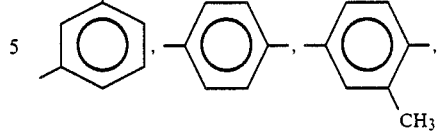

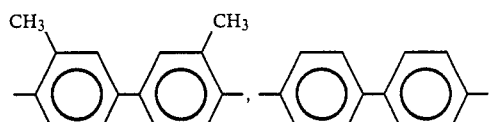

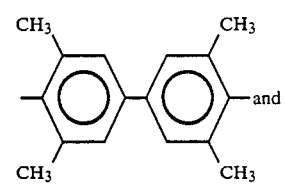

and

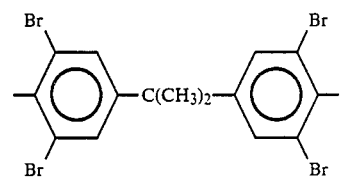

and (B) divalent organic radicals of the general formula

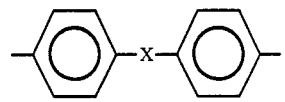

where X ia a member selected from the group consisting of divalent radicals of the formulas —C$_y$H$_{2y}$—,

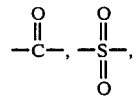

and —O— and —S—where y is an integer from 1 to about 5; and $R^2$ is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, (c) from about C$_2$ to about C$_8$ alkylene terminated polydiorganosiloxane, and (d) divalent radicals of the general formula

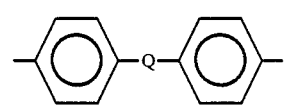

where Q is a member selected from the group consisting of —S—, —O—,

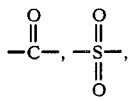

and —$C_xH_{2x}$—, and x is an integer from 1 to about 5, provided that when $R^1$ is

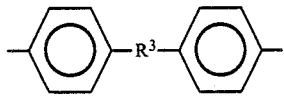

$R^3$ is —O—Z—O—, and Z is

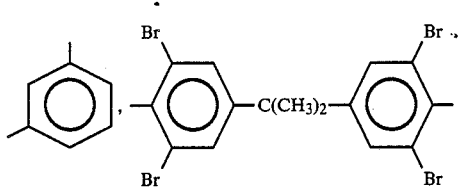

or 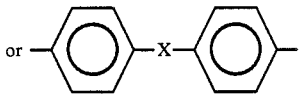

$R^2$ is

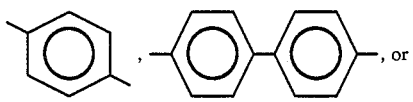, or

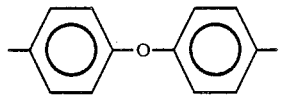

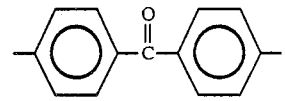

2. The process of claim 1, wherein the reaction solution is heated to a temperature of from about 110° C. to about 200° C.

3. The process of claim 1, wherein the reaction solution is heated to a temperature of from about 135° C. to about 180° C.

4. The process of claim 1, wherein the reaction solution is heated until at least about 90% to the theoretical water of reaction has been evolved.

5. The process of claim 1, wherein the reaction solution is heated until at least about 95% of the theoretical water of reaction has been evolved.

6. The process of claim 1, 2 or 4, wherein the high-boiling aprotic solvent is selected from the group consisting of toluene, xylene, ethylbenzene, propylbenzene, chlorobenzene, dichlorobenzenes, trichlorobenzenes, biphenyl, terphenyl, diphenylether, diphenylsulfide, acetophenone, chlorinated biphenyl and chlorinated diphenylethers.

7. The process of claim 6, wherein the high-boiling, aprotic solvent is o-dichlorobenzene.

8. The process of claim 1, wherein the melt-polymerizing step is conducted at a temperature from about 200° C. to about 450° C.

9. The process of claim 8, wherein the melt-polymerizing step is conducted at a temperature of from about 250° C. to about 75° C.

10. The process of claim 8, wherein the melt-polymerizing step is conducted in an extruder.

* * * * *

UNITED STATES PATENT AND TRADEMARK OFFICE
CERTIFICATE OF CORRECTION

PATENT NO. : 4,835,249
DATED : May 30, 1989
INVENTOR(S) : PATRICK EARL GALLAGHER, ET AL.

It is certified that error appears in the above-identified patent and that said Letters Patent is hereby corrected as shown below:

Col. 1 ln. 19 change "polyimidse" to --polyimides--.
Col. 1 ln. 52 change "Takekohi" to --Takekoshi--.
Col. 2 ln. 34 change "Pats." to --Pat.--.
Col. 2 ln. 45 "in situ" should be underlined.
Col. 6 ln. 36 change "siphenyl" to --diphenyl--.
Col. 7 ln. 38 change "the" (second occurrence) to --The--.
Col. 7 ln. 54 change "Pats." to --Pat.--.
Col. 12 ln. 49, delete "and (first occurrence)

Signed and Sealed this

Eighth Day of May, 1990

Attest:

HARRY F. MANBECK, JR.

*Attesting Officer*                *Commissioner of Patents and Trademarks*